(12) United States Patent
Fukushima

(10) Patent No.: US 6,212,822 B1
(45) Date of Patent: Apr. 10, 2001

(54) **CULTURE MEDIUM FOR *SPARASSIS CRISPA* AND METHODS OF PRODUCING THE SAME**

(75) Inventor: Ryuichi Fukushima, Isezaki (JP)

(73) Assignee: Mitsuwa Kogyo Kabushiki Kaisha, Niigata (JP)

( * ) Notice: Subject to any disclaimer, the term of this patent is extended or adjusted under 35 U.S.C. 154(b) by 0 days.

(21) Appl. No.: 09/349,673

(22) Filed: Jul. 8, 1999

(51) Int. Cl.⁷ ........................................... A01G 1/04
(52) U.S. Cl. ............................................... 47/1.1
(58) Field of Search ..................................... 47/1.1

(56) References Cited

FOREIGN PATENT DOCUMENTS

S57-155218 * 9/1982 (JP).
3-81526 * 3/1991 (JP).

* cited by examiner

Primary Examiner—Bruce R. Campell
Assistant Examiner—Annette H. Para
(74) Attorney, Agent, or Firm—Marshall, O'Toole, Gerstein, Murray & Borun

(57) ABSTRACT

Disclosed are novel culture media for the artificial or industrial cultivation of *Sparassis crispa* (*Sparassis crispa* Wulf.:Fr), comprising larch-tree sawdust and/or chips extracted with heated water or vapor, and methods for producing the same.

8 Claims, No Drawings

CULTURE MEDIUM FOR *SPARASSIS CRISPA* AND METHODS OF PRODUCING THE SAME

TECHNICAL FIELD OF INVENTION

The present invention relates to novel culture media for the artificial/industrial cultivation of *Sparassis crispa* (*Sparassis crispa* Wulf:Fr) and methods for producing the same.

BACKGROUND OF INVENTION

*Sparassis crispa* have been conveniently used in French cuisine because of their excellent texture, their brilliant white color and in particular their unique form resembling *Brassica oleracea*. *Sparassis crispa* is generally referred to in Japanese as "Hanabiratake" and is also occasionally called "Hanabira-maitake" because it grows well on the larch tree.

Very little natural *Sparassis crispa* is harvested and the growth rate thereof is terribly slow. It has therefore been understood in the art that the artificial/industrial cultivation of *Sparassis crispa* is not easy. The present inventor had repeatedly tried to cultivate *Sparassis crispa* by inoculating their strain (seed strain) into a culture medium consisting of larch-tree sawdust as the main ingredient along with the various nutrition, but four (4) months were usually necessary to grow the mature *Sparassis crispa* having the ideal form like *Brassica oleracea*. Using known culture media, the present inventor could not realize artificial/industrial cultivation of *Sparassis crispa*.

On the other hand, with respect to the larch tree, there is a huge amount of useless chips produced by thinning young larch trees. Forests of larch trees are widely distributed in many mountainous regions in Japan, and large amounts of larch-tree chips are usually produced through thinning of the larch tree forest to maintain the proper growth thereof. There is currently no use for such chips other than as a pine stake.

Unfortunately, the disadvantages realized in the conventional cultivation of *Sparassis crispa* have not been solved yet, and therefore there exists a need in the art for method(s) and means for shortening the cultivation period of *Sparassis crispa*.

SUMMARY OF INVENTION

The present invention is directed to solving such disadvantages. The invention is directed to the pretreatment of larch-tree sawdust or chips, to be employed in the present culture medium, comprising a step of heating them in the presence of water and removing therefrom hot-water-soluble components.

The present inventor realized through his research on *Sparassis crispa* that any growth thereof was not observed in broad-leafed trees while such growth was observed in conifer trees, generally in relatively rotten larch trees. This indicates that some component(s) of the coniferous trees may be essential for growth and germination of *Sparassis crispa* mycelium, but some components of fresh conifers may act to inhibit the growth and germination of *Sparassis crispa* mycelium. In nature, such components act as inhibitors that might be eluted slowly through exposure of larch trees to wind and/or rain or through decay thereof in the soil. Thus, such components act as inhibitors that have to be removed to realize an artificial/industrial cultivation of *Sparassis crispa*.

Generally, the solubility of liquid or solid components in water is increased at a higher temperature. Accordingly, the natural condition of rotting larch trees is simulated in the industrial cultivation to effect the elution of the inhibitor by water. That is to say, culture medium was prepared by treating larch-tree sawdust or chips with hot water, removing therefrom hot-water-soluble components, and adding nutrition thereto. According to the present culture medium, mature *Sparassis crispa* can be grown within about 2.5 months cultivation.

The present invention provides a novel culture medium for artificial/industrial cultivation of *Sparassis crispa* produced by heating a mixture comprising larch-tree sawdust or chips as the main ingredient in the presence of water, removing therefrom hot-water-soluble components, and adding nutrition thereto.

DETAILED DESCRIPTION OF THE INVENTION

The detailed description of the present invention is set forth as follows.

The present culture medium comprises larch-tree sawdust or chips as a main ingredient. As an extender, besides sawdust or chips of the other types of trees, any organic or inorganic material may also be used optionally. The amount of such extender to be added to the medium is not limited as long as growth-inhibitors and/or toxic/dangerous components are not eluted into the medium.

According to the preferred method of making the present culture medium, first, the raw medium comprising as a main ingredient larch-tree sawdust and/or chips, or a mixture of the raw medium and the extender is prepared. Such raw medium or the mixture is then heated in the presence of water. This step is performed preferably with water at about 100° C. or vapor at about 130° C. under a pressure of about atmospheric pressure or above, for example, up to about five atmospheres. Treatment (heating) time can be shortened by increasing the water temperature and/or the pressure.

Then, nutrition and, if necessary, pH adjustor, is/are supplemented into the culture medium so produced. The nutrition may include any of those containing nitrogen, proteins, carbohydrates, minerals or the like, or a combination thereof For industrial cultivation of *Sparassis crispa*, industrial waste can also be utilized preferably. The industrial waste may include preferably, for example, brewer's grain.

The culture medium containing the nutrition is sterilized by heating it and is then cooled. A strain of *Sparassis crispa* is inoculated into the medium so prepared. The culture medium thus inoculated is left at a temperature of about 25° C. for about 1.5 months. Upon forming a *Sparassis crispa* fruit-body primordium, the culture medium is transferred into a culture chamber. Mature *Sparassis crispa* are then be harvested by keeping the medium in the chamber for about one month under a relative humidity of about 90% to about 95%.

*Sparassis crispa* is very popular due to its brilliant white color, its unique form resembling *Brassica oleracea*, its excellent texture without any unacceptable taste, and in particular its long shelf-life. According to the present invention, the artificial/industrial cultivation of such *Sparassis crispa* can be realized and provided.

It has been quite difficult to cultivate *Sparassis crispa* in the summer because of the relatively high required temperature of from about 20 to about 28° C. for forming its fruit-body primordium. However, according to the present invention, it is possible to cultivate *Sparassis crispa* in the summer by, for example, applying mist thereto and reducing the temperature by the heat of vaporization (about 6 to about 7° C. reduction). Thereby, *Sparassis crispa* can be provided throughout the year without idling cultivation facilities.

Further, according to the other preferred embodiment of the present invention, utilization of chips produced by thinning larch trees can now be offered.

EXAMPLES

The present invention is further detailed in the following illustrative examples, which are not intended to restrict the invention.

Example 1

1 kg of larch-tree sawdust was boiled in 5 L of hot water at 98° C. for 180 minutes. Then, to prepare a raw culture medium, it was cooled, dehydrated and was further dried.

The following solid components as well as the liquid components respectively are added to the raw culture medium to prepare the present culture medium.

| Solid Components | |
|---|---|
| Wheat Flour | 336 g |
| Banana | 30 g |
| EBIOS (brewer's grain: Asahi Brewery Co. Ltd.) | 23 g |
| Peptone | 0.75 g |
| Calcium Chloride | 0.3 g |
| Liquid Components | |
| Water | 1470 mL |
| Honey | 23 g |
| HYPONEX (liquid fertilizer: Hyponex Japan Co. Ltd.) | 0.3 mL |

The culture medium including the above-listed components was then sterilized by heating it at 115° C. under 1.8 atmospheres for 70 minutes and then cooling it. A strain of *Sparassis crispa* (seed strain) was then inoculated into the sterilized culture medium.

By keeping the inoculated culture medium at a temperature of about 25° C. at 70% relative humidity for 1.5 months and growing for another one month, mature *Sparassis crispa* were obtained.

Example 2

The present culture medium was prepared in the same manner as Example 1 except for performing, prior to washing with water, exposure of the larch-tree sawdust to vapor at 121° C. and 2 atmospheres pressure for 60 minutes, instead of boiling the larch-tree sawdust in hot water. In this example, mature *Sparassis crispa* were also obtained within a shorter cultivation period.

Numerous modifications and alternative embodiments/examples of the invention will be apparent to those skilled in the art in view of the foregoing description. This description is to be constructed as illustrative only, and is for the purpose of teaching those skilled in the art the best mode of carrying out the invention. The details of the culture medium and the methods for making the same may be varied substantially without departing from the spirit of the invention, and the exclusive use of all modifications which come within the scope of the appended claims is reserved.

What is claimed is:

1. A culture medium for cultivation of *Sparassis crispa* (*Sparassis crispa* Wulf.:Fr) comprising larch-tree sawdust or chips, wherein the hot-water-soluble components in the sawdust or the chip are substantially removed.

2. The culture medium according to claim 1, wherein said hot-water-soluble components in the sawdust or the chips are removed by heating said sawdust or chips in the presence of water.

3. The culture medium according to claim 2, wherein said heating is performed with water of about 100° C. or vapor of about 130° C. under a pressure of from about one atmosphere pressure to about five atmospheres.

4. The culture medium according to claim 1, wherein the medium further comprises nutrients selected from the group consisting of nitrogen, proteins, carbohydrates, minerals and mixtures thereof.

5. A method for producing a culture medium for cultivation of *Sparassis crispa* (*Sparassis crispa* Wulf.:Fr) comprising the steps of:

(a) heating a raw culture medium comprising larch-tree sawdust or chips in the presence of water; and (b) removing hot-water-soluble components from said sawdust or chips.

6. The method according to claim 5, wherein the method further comprises the step of:

(c) adding nutrients to the culture medium.

7. The method according to claim 5, wherein said step (a) is performed with water at about 100° C. or vapor at about 130° C. under a pressure of from about one atmosphere to about five atmospheres.

8. The method according to claim 6, wherein said nutrients is selected from the group consisting of nitrogen, proteins, carbohydrates, minerals and mixtures thereof.

* * * * *